US006989965B2

(12) United States Patent
Mundt et al.

(10) Patent No.: US 6,989,965 B2
(45) Date of Patent: Jan. 24, 2006

(54) HEAD SLIDER HAVING TILTED PROTRUSIONS FOR RAMP LOAD-UNLOAD APPLICATIONS (75) Inventors: Michael D. Mundt, Longmont, CO (US); Anthony P. Sannino, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 144 days.

(21) Appl. No.: 10/422,325

(22) Filed: Apr. 24, 2003

(65) Prior Publication Data
US 2004/0090709 A1 May 13, 2004

Related U.S. Application Data (60) Provisional application No. 60/424,530, filed on Nov. 7, 2002.

(51) Int. Cl.
G11B 5/60 (2006.01)

(52) U.S. Cl. ............... 360/235.4; 360/235.7; 360/236.3; 360/236.5; 360/237

(58) Field of Classification Search ... 360/235.4–237.1
See application file for complete search history.

(56) References Cited

U.S. PATENT DOCUMENTS

| 4,212,044 A | 7/1980 | Plotto ............... 360/103 |
| 4,218,715 A | 8/1980 | Garnier ............. 360/103 |
| 4,553,184 A | 11/1985 | Ogishima ............. 360/103 |
| 4,636,894 A | 1/1987 | Mo ................... 360/103 |
| 4,646,180 A | 2/1987 | Ohtsubo ............. 360/103 |
| 4,670,806 A | 6/1987 | Ghose ............... 360/103 |
| 4,673,996 A | 6/1987 | White ............... 360/103 |
| 4,757,402 A | 7/1988 | Mo ................... 360/103 |
| 4,984,114 A | 1/1991 | Takeuchi et al. ..... 360/103 |
| 5,062,017 A | 10/1991 | Strom et al. ........ 360/103 |
| 5,086,360 A | 2/1992 | Smith et al. ........ 360/103 |
| 5,128,822 A | 7/1992 | Chapin et al. ....... 360/103 |
| 5,200,868 A | 4/1993 | Chapin et al. ....... 360/103 |
| 5,218,494 A | 6/1993 | Chapin et al. ....... 360/103 |
| 5,218,495 A | 6/1993 | Chapin et al. ....... 360/103 |
| 5,317,465 A | 5/1994 | Chapin et al. ....... 360/103 |
| 5,343,343 A | 8/1994 | Chapin .............. 360/103 |
| 5,359,480 A | 10/1994 | Nepela et al. ....... 360/103 |
| 5,424,888 A | 6/1995 | Hendriks et al. ..... 360/103 |
| 5,430,591 A | 7/1995 | Takeuchi et al. ..... 360/103 |

(Continued)

FOREIGN PATENT DOCUMENTS

EP 0747890 A1 12/1996

(Continued)

OTHER PUBLICATIONS

Zeng, Q., et al., "Slider Air Searing Designs for Load/Unload Applications", TMRC' 98, IEEE Trans. of Magnetics, vol. 35(2), pp. 746-751, Mar. 1999.

Primary Examiner—A. J. Heinz
(74) Attorney, Agent, or Firm—Westman, Champlin & Kelly; Todd R. Fronek (57) ABSTRACT A slider includes a slider body having a leading edge, a trailing edge, a first side edge, a second side edge and a center line extending between the leading edge and the trailing edge, which define a disc-facing surface having a bearing plane. A protrusion is positioned on the disc-facing surface along the first side edge and has a protrusion surface. The protrusion surface is tilted with respect to the bearing plane about the center line and towards the first side edge.

23 Claims, 6 Drawing Sheets

U.S. PATENT DOCUMENTS

| | | | |
|---|---|---|---|
| 5,490,026 A | 2/1996 | Dorius et al. | 360/103 |
| 5,499,149 A | 3/1996 | Dovek | 360/103 |
| 5,508,862 A | 4/1996 | Lazzari et al. | 360/103 |
| 5,509,554 A | 4/1996 | Samuelson et al. | 360/103 |
| 5,513,056 A | 4/1996 | Kawasaki et al. | 360/103 |
| 5,515,219 A | 5/1996 | Ihrke et al. | 360/103 |
| 5,537,273 A | 7/1996 | Hendriks et al. | 360/103 |
| 5,550,693 A | 8/1996 | Hendriks et al. | 360/103 |
| 5,624,581 A | 4/1997 | Ihrke et al. | 216/22 |
| 5,636,085 A | 6/1997 | Jones et al. | 360/103 |
| 5,726,831 A | 3/1998 | White | 360/103 |
| 5,737,151 A | 4/1998 | Bolasna et al. | 360/103 |
| 5,761,004 A | 6/1998 | Peck | 360/103 |
| 5,796,551 A | 8/1998 | Samuelson | 360/103 |
| 5,862,013 A | 1/1999 | Haga | 360/103 |
| 5,953,181 A | 9/1999 | Utsunomiya | 360/103 |
| 5,963,396 A | 10/1999 | Burga et al. | 360/103 |
| 5,973,881 A | 10/1999 | Ajiki | 360/103 |
| 6,040,965 A | 3/2000 | Terunuma et al. | 260/122 |
| 6,055,129 A | 4/2000 | Park et al. | 360/103 |
| 6,144,528 A | 11/2000 | Anaya-Dufresne et al. | 360/235.5 |
| 6,198,600 B1 | 3/2001 | Kitao et al. | 360/235.2 |
| 6,215,621 B1 | 4/2001 | Boutaghou | 360/236.6 |
| 6,229,671 B1 | 5/2001 | Boutaghou et al. | 360/235.1 |
| 6,236,543 B1 | 5/2001 | Han et al. | 360/236.6 |
| 6,483,668 B2 * | 11/2002 | Hipwell et al. | 360/235.9 |
| 6,490,135 B1 | 12/2002 | Sannino et al. | 360/235.8 |
| 6,504,682 B1 | 1/2003 | Sannino et al. | 360/235.8 |

FOREIGN PATENT DOCUMENTS

| | | |
|---|---|---|
| JP | 60-242548 | 12/1985 |
| JP | 1-211383 | 8/1989 |
| JP | 1-245480 | 9/1989 |
| JP | 1-319188 | 12/1989 |
| JP | 3-132981 | 6/1991 |
| WO | WO 86/03048 | 5/1986 |

* cited by examiner

HEAD SLIDER HAVING TILTED PROTRUSIONS FOR RAMP LOAD-UNLOAD APPLICATIONS

CROSS-REFERENCE TO RELATED APPLICATION

This application claims the benefit of U.S. Provisional Application Ser. No. 60/424,530, entitled "Tilted Trenched Pads to Increase AAB Robustness Against Load/Unload-Induced Head-Media Contact", filed Nov. 7, 2002.

BACKGROUND OF THE INVENTION

The present invention relates to disc drive data storage systems and, more particularly, to a disc drive data storage system having a slider with an increased bearing stiffness for ramp load-unload and other applications.

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to fly above or in close proximity to the disc surface.

In ramp load-unload applications, the disc drive further includes a ramp positioned at an outer diameter of the disc for engaging the suspension. When the disc drive is powered down, the actuator mechanism moves the head gimbal assembly radially outward until the suspension engages the ramp, causing the slider to lift off of the disc surface. During power-up, the disc is accelerated to its normal operating velocity and then the actuator mechanism moves the head gimbal assembly radially inward such that the suspension disengages the ramp allowing the slider to become loaded on to the disc surface.

Using a ramp to load and unload the head gimbal assembly to and from the disc surface has been regarded as an attractive alternative to "contact start/stop" technology in which the slider lands and takes-off from a dedicated zone on the disc surface. The ramp load-unload technique can be used for solving tribological problems associated with lower fly heights and for meeting severe requirements of non-operational shock performance. However, this technique introduces an array of other challenges, such as possible severe head-media impact during loading and unloading operations.

Under nominal conditions, advanced air bearings (AABs) can be designed to avoid head-media contact during load and unload. Manufacturing of actual parts, however, introduces deviation from nominal conditions, which can result in larger susceptibility to impact during load-unload operations. Among the numerous dimensions and geometrical features to be controlled during manufacturing, pitch static angle (PSA) and roll static angle (RSA) are the most critical parameters for load-unload applications. PSA is the angle formed between the slider and the suspension in a direction parallel to the suspension's axis of symmetry when no air bearing is formed (i.e., in a "static" state). RSA is the angle formed between the slider and the suspension in a direction perpendicular to the suspension's axis of symmetry. Since PSA and RSA have an influence on the pitch and roll attitude of the slider during flight, a non-optimal PSA or RSA results in the slider tilting with respect to the radial motion of the suspension during loading and unloading operations. Under these conditions, it is possible that edges or corners of the slider can become close enough to the media to induce light contact or severe impact. This contact can cause damage to stored data and can cause permanent physical damage to the media.

A slider is desired, which increases the load-unload robustness by preventing or reducing head-media contact over an acceptable range of manufacturing deviations in RSA and PSA from nominal RSA and PSA values.

SUMMARY OF THE INVENTION

One embodiment of the present invention relates to a slider. The slider includes a slider body having a leading edge, a trailing edge, a first side edge, a second side edge and a center line extending between the leading edge and the trailing edge, which define a disc-facing surface having a bearing plane. A protrusion is positioned on the disc-facing surface along the first side edge and has a protrusion surface. The protrusion surface is tilted with respect to the bearing plane about the center line and towards the first side edge.

Another aspect of the invention is a head slider. The slider includes a slider body having a leading edge, a trailing edge, a first side edge, a second side edge and a center line extending between the leading edge and the trailing edge, which define a disc-facing surface having a bearing plane. A protrusion is positioned on the disc-facing surface and has a first protrusion surface and a second protrusion surface recessed from the first protrusion surface. At least one of the first protrusion surface and the second protrusion surface is tilted with respect to the bearing plane about the center line.

Another embodiment of the present invention is a slider configured to divert air flow onto a protrusion surface tilted with respect to a center line. During ramp load/unload operations, the slider has increased roll stiffness, which prevents contact between a slider and a disc.

DETAILED DESCRIPTION OF ILLUSTRATIVE EMBODIMENTS

Figure 1:
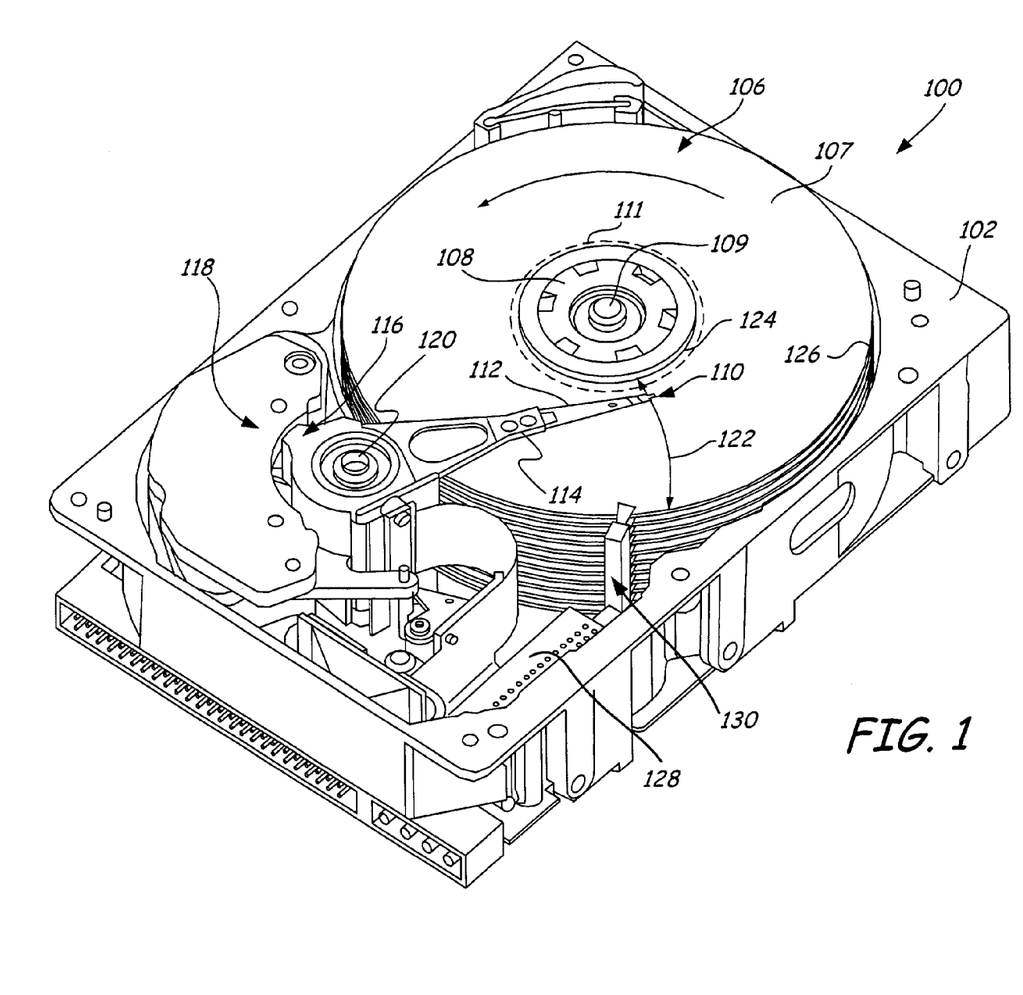
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing that provides high pitch and roll stiffness, which reduces the chance of head-media contact in ramp load-unload applications. In ramp load-unload applications, disc drive 100 includes a ramp 130 for each suspension 112. Ramps 130 are positioned near disc outer diameter 126. When disc drive 100 is powered-down, voice coil motor 118 rotates actuator 116 toward disc outer diameter 126 so that suspensions 112 engage the respective ramps 130. Ramps 130 lift suspensions 112 so that sliders 110 are unloaded from the disc surface. During power-up, once discs 107 have accelerated to their operating rotation velocity, voice coil motor 118 rotates actuator 116 in a radially inward direction to disengage suspensions 112 from ramps 130 and thereby load sliders 110 onto the disc surfaces. When sliders 110 are loaded onto the disc surfaces, the process of disengaging the suspensions from the ramp introduces a roll motion and a pitch motion in the sliders. Depending upon the magnitude of the roll and pitch motion, the pitch static angle (PSA) of the suspension, and the roll static angle (RSA) of the suspension, it is possible that the attitude of a typical slider with respect to the radial load-unload motion of actuator 116 can cause the edges or corners of the slider to contact the disc surface. This contact can range from light contact to severe impact and can cause damage to stored data or permanent physical damage to the media. Sliders 110 have a bearing geometry that reduces the chances of such contact and compensates for larger variations in PSA and RSA.

Figure 2:
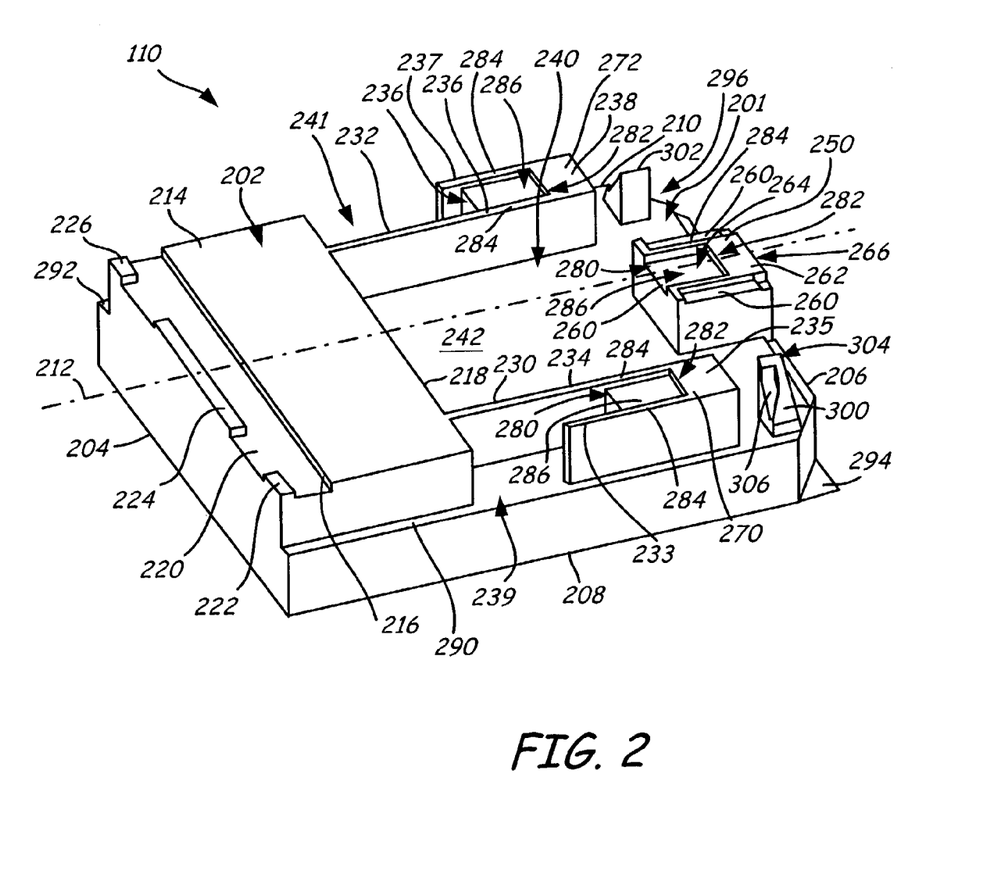
FIG. 2 is a perspective view of a slider shown in FIG. 1, as viewed from the surface of a disc, according to one embodiment of the present invention.

FIG. 2 is an isometric view of one of the sliders 110 of FIG. 1, as viewed from the surface of disc 107 according to one embodiment of the present invention. Slider 110 has a disc facing surface 201, which includes a bearing surface 202. Bearing surface 202 is a reference level for disc facing surface 201 from which other surface levels are recessed, raised or tilted (or tapered). Surfaces forming bearing surface 202 generally lie in a bearing plane. Slider 110 may be fabricated with a crown or cross curvature in its length and/or width directions. References made to relative surface depths and angles may reflect this crown and cross curvature. Disc facing surface 201 includes a leading slider edge 204, a trailing slider edge 206, slider side edges 208 and 210, and a lateral center line 212. A cavity dam 214 extends between side edges 208 and 210, generally along leading slider edge 204. In one embodiment, the upper surface of cavity dam 214 is generally coplanar with and defines a portion of bearing surface 202. Cavity dam 214 has a leading edge 216 and a trailing edge 218.

A "stepped" leading taper 220 is formed along the leading edge 216 of cavity dam 214. "Stepped" leading taper 220 is recessed from bearing surface 202 by a substantially constant step depth in the range of about 0.1 microns to about 0.3 microns, for example, in order to provide pressurization for the bearing surface. Other step depths can also be used. In an alternative embodiment, leading taper 220 has a depth relative to the bearing plane that gradually decreases from leading slider edge 204 to the leading edge 216 of cavity dam 214. Leading taper 220 can be formed by any method, such as ion milling, reactive ion etching (RIE) or lapping. In one embodiment, leading taper 220 is formed by ion milling through a gray scale photolithography mask that allows multiple depths to be etched with a single mask. Leading taper 220 serves to pressurize air as the air is dragged under slider 110 by the disc surface. An additional effect of leading taper 220 is to create a first peak near leading edge 204 in the pressure distribution under slider 110. Leading taper 220 includes raised protrusions 222, 224 and 226 to aid in blocking particles from entering between a disc and disc facing surface 201.

A first side rail 230 is positioned along slider side edge 208 and a second side rail 232 is positioned along slider side edge 210. First side rail 230 includes an outside wall 233, an inside wall 234 and a trailing wall 235. Likewise, second side rail 232 includes an inside wall 236, an outside wall 237 and a trailing wall 238. Inside wall 234 extends from trailing wall 235 to cavity dam 214 while outside wall 233 extends from trailing wall 235 towards cavity dam 214 and defines an opening 239 between trailing wall 235 and cavity dam 214. Inside wall 236 extends from trailing wall 238 to cavity dam 214 while outside wall 237 extends from trailing wall 238 and defines an opening 241 between trailing wall 238 and cavity dam 214.

A subambient pressure cavity 240 is defined between cavity dam 214 and side rails 230 and 232. Subambient pressure cavity 240 is a recessed area having a cavity floor 242 which is recessed from bearing surface 202 by a cavity depth, which is greater than the step depth. In one embodiment, cavity depth 242 is in the range of about 1 micron to about 3 microns. Other cavity depths can also be used.

Subambient pressure cavity 240 trails cavity dam 214 relative to a direction of air flow from leading slider edge 204 toward trailing slider edge 206. Rails 230 and 232 define the cavity and isolate the cavity from ambient pressure along slider side edges 208 and 210.

Slider 110 further includes an isolated center bearing pad 250, which is positioned along trailing slider edge 206. Center pad 250 is positioned along lateral center line 212. In alternative embodiments, center pad 250 can be skewed or offset with respect to line 212 or trailing edge 206.

Center pad 250 has leading and side step surfaces 260, a bearing surface 262 and a convergent channel feature (or "trench") 264. Bearing surface 262 is generally coplanar with the upper surface of cavity dam 214 and the bearing plane. Leading and side step surfaces 260 are generally parallel to and recessed from bearing surface 262 by the step depth of 0.1 to 0.3 microns, for example, for providing pressurization of bearing surface 262 from air flow venting from cavity 240. Center pad 250 supports a read/write transducer 266 along trailing slider edge 206. In alternative embodiments, transducer 266 can be positioned at other locations on slider 110. However, when placed at or near trailing slider edge 206, transducer 266 is located near the closest point on slider 110 to the surface of disc 107 (shown in FIG. 1) when slider 110 flies with a positive pitch angle. With a positive pitch angle, trailing slider edge 206 is closer to the surface of disc 107 than leading slider edge 204.

Similarly, side rails 230 and 232 include bearing surfaces 270 and 272 and convergent channel features 274 and 276, respectively. Bearing surfaces 270 and 272 are generally coplanar with the upper surface of cavity dam 214 and bearing surface 202.

Channels 264, 274 and 276 each have a leading channel end (or "inlet") 280, a trailing channel end (or "outlet") 282, side walls 284 and a channel floor 286. Channels 264, 274 and 276 can also be formed through photolithography processes such as ion milling, chemical etching or reactive ion etching (RIE), for example. Alternatively, channels 264, 274 and 276 can be formed along with rails 230 and 232 and pad 250 through an additive process such as material deposition.

In the embodiment shown in FIG. 2, channel floors 286 are recessed from the bearing plane by the step depth. In an alternative embodiment, channel floors 286 are vertically contoured relative to bearing surfaces 262, 270 and 272. For example, channel floors 286 can be tapered or otherwise vertically profiled so that the channel floors have a depth relative to bearing surfaces 262, 270 and 272 that progressively decreases along all or part of the length of the channel from leading channel end 280 to trailing channel end 282. The vertical profile can be linear, rectilinear, curved, curvilinear or a combination of these profiles. Also, a plurality of stepped surfaces can be used to approximate a taper along channel floors 286. Other vertically tapered profiles can also be used.

Leading channel end 280 of channel 264 is open to fluid flow from cavity 240. Leading channel ends 280 of channels 274 and 276 are open to fluid flow at ambient pressure from openings 239 and 241. Trailing channel ends 282 are closed to the fluid flow. Once the fluid flow enters channels 264, 274 and 276, the flow is essentially bounded by channel side walls 284 and trailing channel ends 282 and is forced to rise over trailing channel ends 282, forming a "convergent" channel for the flow. This creates localized pressure areas at discrete regions on bearing surfaces 262, 270 and 272, just rearward of trailing channel ends 282. In one embodiment, these discrete regions have surface areas rearward of trailing channels ends 282 that are at least as long as the width of the channels, as measured between side walls 284. This provides sufficient surface area on which the localized pressure gradients can act. These channels can be symmetrical about lateral center line 212, as shown in FIG. 2, or can be asymmetrical to provide preferential pressurization at certain slider skew angles. Channel side walls 284 can be parallel to one another or non-parallel to one another.

The localized positive pressure gradients developed along bearing surfaces 262, 270 and 272 assist in providing pitch and roll stiffness to slider 110 and provide an energy dissipation mechanism during slider vibration, which dampens leading edge pitch and roll mode type vibrations at the slider's natural resonance frequencies. Leading edge pitch mode type vibration refers to rotation about a line near the leading edge of the slider, whereas trailing edge pitch mode vibration refers to rotation about a line near the trailing edge of the slider. Roll mode type vibrations refer to rotation about the slider's lateral center line 212.

Recessed areas 290 and 292 are located along side edges 208 and 210, respectively. From the design of side rails 230 and 232, convergent channels 274 and 276 are generally open to recessed areas 290 and 292, respectively. Consequently, more airflow is provided to channels 274 and 276, and bearing surface 270 and 272 experience additional pressurization. Since inside walls 234 and 236 extend to cavity dam 214, side rails 230 and 232 isolate convergent channels 274 and 276 from subambient pressure cavity 240.

If desired, slider 110 may include recessed corner surfaces 294 and 296. These surfaces 294 and 296 may be recessed from bearing surface 202 by about 1 to 5 microns and aid in preventing slider 110 from contacting a surface of a disc during both operation and during load/unload of the slider.

Slider 110 further includes tilted protrusions 300 and 302. Protrusion 300 is positioned proximate an intersection of side edge 208 and trailing edge 206 while protrusion 302 is positioned proximate an intersection of side edge 210 and trailing edge 206. Protrusions 300 and 302 have upper protrusion surfaces 304 that are tilted (or angled) with respect to bearing surface 202 and can be made using gray-scale photo-lithography or other methods, as desired. Protrusion surface 304 lies in a plane that is rotated with respect to the bearing plane (or relative to the bearing plane) about center line 212 toward side edge 208. In one embodiment, the amount of rotation from bearing surface 202 is approximately 0.5 to 2.5 degrees, which corresponds to 8,700 to 43,000 micro-radians. In an alternative embodiment, protrusion surface 304 is curved in order to pressurize air from side edge 208.

As discussed below, the protrusion surface may also be tilted about an axis parallel to trailing edge 206 and towards trailing edge 206. Additionally, protrusion 300 includes a recessed convergent channel (or "trench") 306. When suspension 112 is disengaged from ramp 130 to load slider 110 onto the disc surface, protrusion surface 304 is pressurized by trench 306 to provide sufficient pressure in order to prevent slider 110 from contacting the disc surface. In one embodiment illustrated, protrusion 300 is generally isolated from rail 230 and other elements positioned on disc facing surface 201. Accordingly, protrusion 300 will have little or no effect upon the pressure developed on bearing surface 202 during normal operation of slider 110. Protrusion 302 is similarly structured and includes a planar rotation about center line 212 towards side edge 210.

Figure 3:
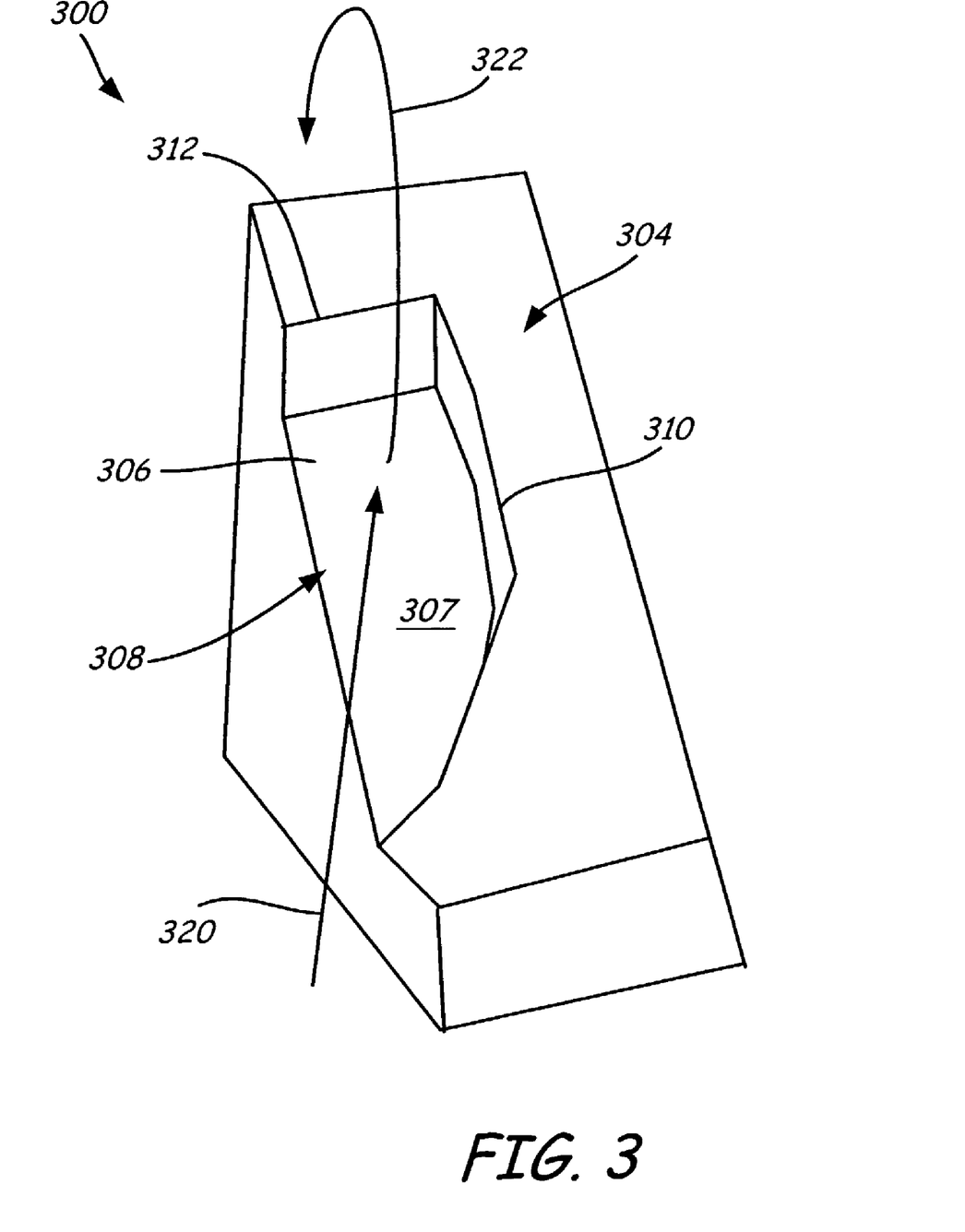
FIGS. 3–7 are perspective views of exemplary tilted protrusions according to embodiments of the present invention.

FIG. 3 is a close up view of protrusion 300. Trench 306 includes a trench floor 307, an inlet 308, a side wall 310 and a trailing wall 312. In one embodiment, trench floor 307 is parallel with protrusion surface 304. As suspension 112 disengages from ramp 130, protrusion 300 is pressurized, which prevents slider 110 from contacting a disc surface. As slider 110 rolls towards the disc surface, airflow (shown as arrow 320) enters into trench 306 via inlet 308. Inlet 308 is open to fluid flow from side edge 208 and faces leading edge 204. The airflow is bound by trench floor 307 and side wall 310 and converges to trailing wall 312. Upon reaching trailing wall 312, airflow (shown as arrow 322) is forced over trailing wall 312, which pressurizes an area of protrusion surface 304 adjacent to trailing wall 312. This pressurization provides lift to slider 110 to prevent slider 110 from contacting a disc surface.

As appreciated by those skilled in the art, alternative configurations and orientations of tilted protrusions may be applied to slider 110. "Tilted" protrusions may include a broad range of surface features that serve to pressurize a slider during load/unload operations. For example, tilted may mean a series of step portions for generating pressure between a slider and a disc that together create a tilted protrusion or a curved surface, both of which accommodate varying degrees of RSA. FIGS. 4 through 7 illustrate alternative protrusions that operate in a manner similar to protrusion 300. Each of the protrusions can be positioned on a slider, for example slider 110, and include a protrusion surface tilted with respect to the bearing plane about center line 212 towards side edge 208 or 210. The protrusions also include a trench having a trench floor. The trench floor may be linear or curved in either a concave or convex configuration. The tangent of the curve may vary across the trench floor so as to pressurize the protrusion over a range of roll and/or pitch angles, for example an approximate range of 0.5 to 2.5 degrees.

Figure 4:
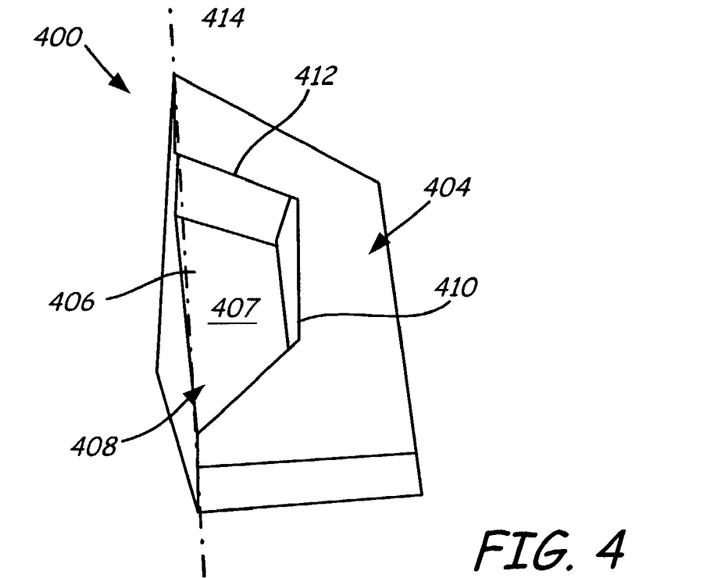

FIG. 4 illustrates a protrusion 400 that includes a tilted protrusion surface 404 and a trench 406. Trench 406 includes trench floor 407, inlet 408, side wall 410 and trailing wall 412. Protrusion surface 404 is also tilted toward a trailing edge of the slider about an axis 414 parallel to the trailing edge. Having protrusion surface 404 tilted towards the trailing edge allows for prevention of head/disc contact for varying degrees of pitch static angle (PSA).

Figure 5:
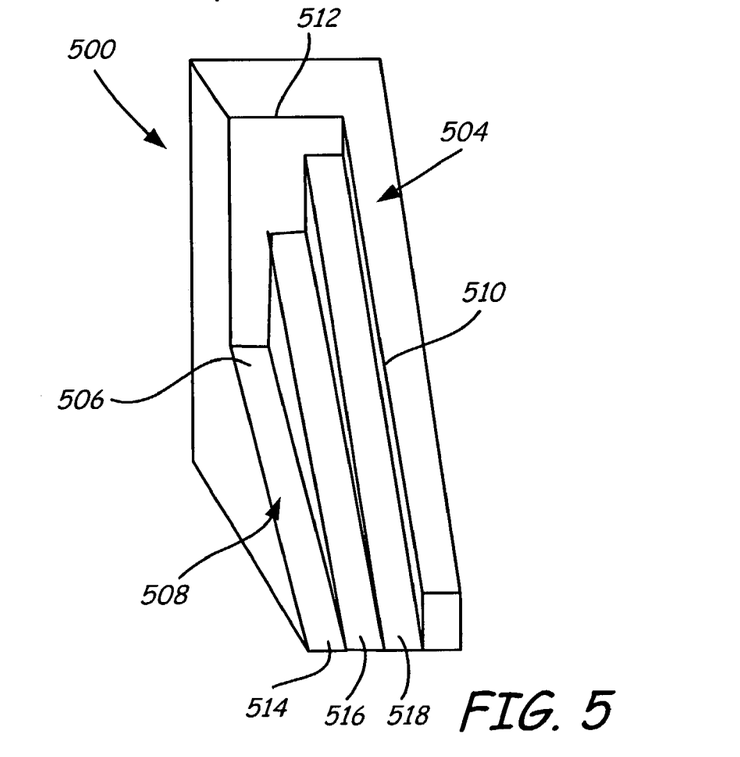

FIG. 5 illustrates a protrusion 500 having a tilted protrusion surface 504 and a trench 506. Trench 506 includes an inlet 508, a side wall 510 and a trailing wall 512. Trench 506 also includes stepped floor portions 514, 516 and 518. Stepped floor portions 514, 516 and 518 are tilted with respect to each other about center line 212 to pressurize protrusion 500 at various angles during a load/unload operation.

Figure 6:
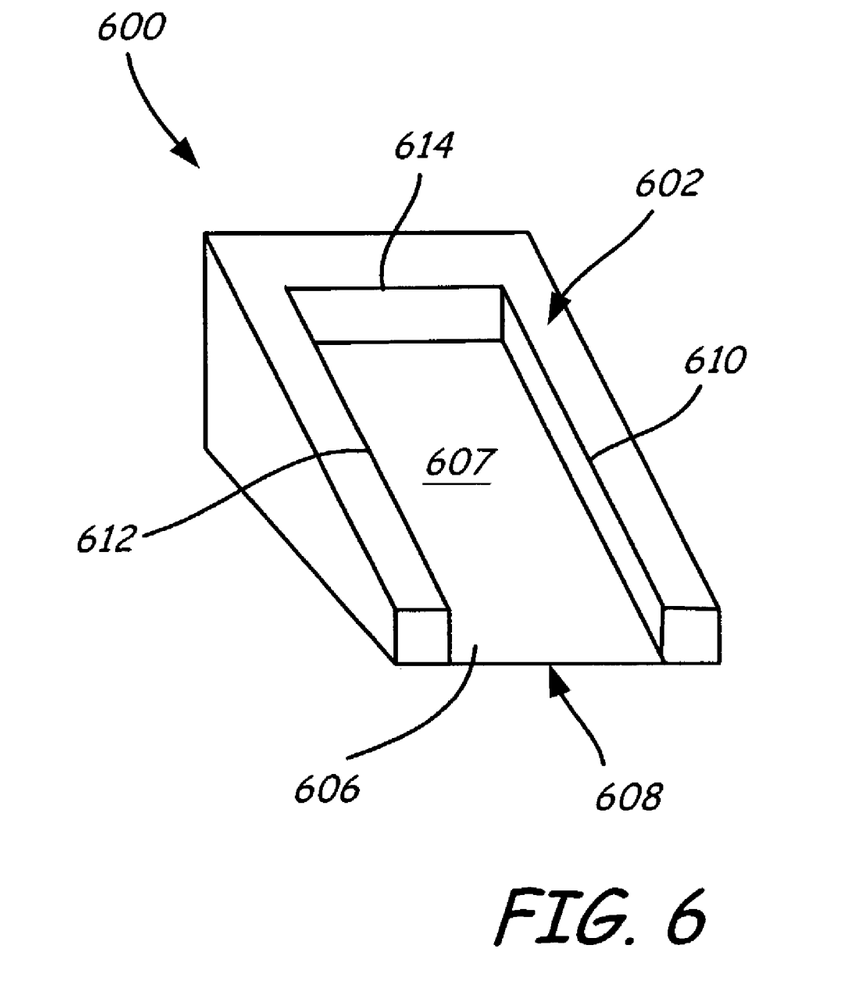

FIG. 6 illustrates a protrusion 600 that has a tilted protrusion surface 604 and a trench 606. Trench 606 includes a trench floor 607, an inlet 608, side walls 610 and 612 and a trailing wall 614. Side walls 610 and 612 both serve to bound air flow from inlet 608 to trailing wall 614.

Figure 7:
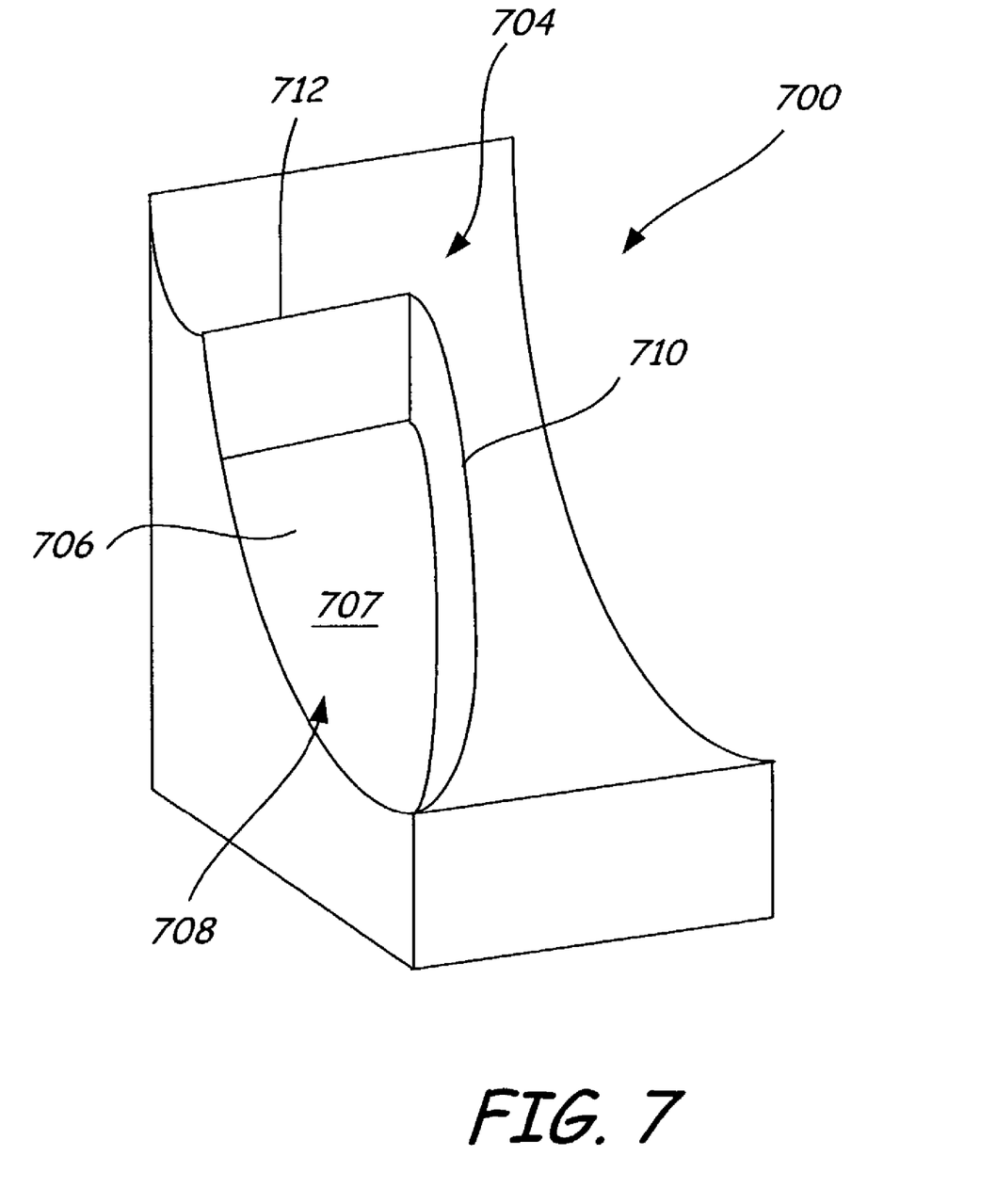

FIG. 7 illustrates a protrusion 700 that has a tilted protrusion surface 704 and a trench 706. Protrusion surface 704 is curved to accommodate varying degrees of RSA. Trench 706 includes a trench floor 707, an inlet 708, side wall 710 and a trailing wall 712. Trench floor 707 is curved similarly to protrusion surface 704. Side wall 710 and trailing wall 712 bound air flow from inlet 708.

In summary, one aspect of the present invention is a head slider (110). The slider (110) includes a slider body having a leading edge (204), a trailing edge (206), a first side edge (208), a second side edge (210) and a center line (212) extending between the leading edge (204) and the trailing edge (206), which define a disc-facing surface (201) having a bearing plane. A protrusion (300, 302, 400, 500, 600, 700) is positioned on the disc-facing surface (201) along the first side edge (208) and has a protrusion surface (304, 404, 504, 604, 704). The protrusion surface (304, 404, 504, 604, 704) is tilted with respect to the bearing plane about the center line (212) and towards the first side edge (208).

Another aspect of the invention is a head slider (110). The slider (110) includes a slider body having a leading edge (204), a trailing edge (206), a first side edge (208), a second side edge (210) and a center line (212) extending between the leading edge (204) and the trailing edge (206), which define a disc-facing surface (201) having a bearing plane. A protrusion (300, 302, 400, 500, 600, 700) is positioned on the disc-facing surface (201) and has a first protrusion surface (304, 404, 504, 604, 704) and a second protrusion surface (306, 406, 506, 606, 706) recessed from the first protrusion surface (304, 404, 504, 604, 704). At least one of the first protrusion surface (304, 404, 504, 604, 704) and the second protrusion surface (306, 406, 506, 606, 706) is tilted with respect to the bearing plane about the center line (212).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the slider example described is a negative pressure slider, it will be appreciated by those skilled in the art that the teachings of the present invention can be applied to other types of sliders, such as positive pressure slider having no cavity dam without departing from the scope and spirit of the present invention. Also, the present invention can be used with any type of ramp load-unload suspension, such as rotary and linear suspensions, and the transducing head can be of any type such as magnetic, magneto-resistive, optical or magneto-optical, for example.

What is claimed is:

1. A slider, comprising:
   a slider body having a bearing surface having a bearing plane; and
   a protrusion on the bearing surface having a protrusion surface, the protrusion surface tilted with respect to the bearing plane about a central axis of the slider body wherein the protrusion further comprises a trench having an inlet that is open to fluid flow.

2. The slider of claim 1 wherein the trench further includes a trench floor, a side wall and a trailing wall.

3. The slider of claim 2 wherein the trench floor is parallel to the protrusion surface.

4. The slider of claim 2 wherein the trench floor includes a plurality of step portions, wherein adjacent step portions lie in planes that are tilted about the central axis and with respect to each other.

5. The slider of claim 2 wherein the trench floor is curved.

6. The slider of claim 2 wherein the trench further includes a second side wall spaced apart from the first-mentioned side wall by the trench floor.

7. The slider of claim 1 wherein the protrusion surface is tilted with respect to the bearing plane by about 0.5 to 2.5 degrees.

8. The slider of claim 1 wherein the protrusion surface is further tilted with respect to the bearing plane towards a trailing edge of the slider body.

9. The slider of claim 1 wherein the protrusion surface is curved.

10. The slider of claim 9 and further comprising a first side rail positioned on the bearing surface, a second side rail positioned on the bearing surface and a cavity dam positioned on the bearing surface extending between the first and second side rails.

11. The slider of claim 1 and further comprising a second protrusion on the bearing surface and having a protrusion surface, the protrusion surface tilted with respect to the bearing plane about the central axis.

12. A slider, comprising:
   a slider body having a bearing surface having a bearing plane; and a protrusion on the bearing surface having a first protrusion surface and a second protrusion surface that is recessed from the first protrusion surface and forms a trench floor and an opening, wherein at least one of the first protrusion surface and the second protrusion surface is tilted with respect to the bearing plane about a central axis of the slider body.

13. The slider of claim 12 wherein the protrusion further comprises a side wall extending between the first protrusion surface and the second protrusion surface.

14. The slider of claim 12 wherein said at least one of the first protrusion surface and the second protrusion surface is curved.

15. The slider of claim 12 wherein the trench floor is curved.

16. The slider of claim 12 wherein the first protrusion surface and the second protrusion surface are substantially parallel.

17. The slider of claim 12 wherein the protrusion is positioned proximate a first side edge of the slider body and proximate a trailing edge of the slider body.

18. The slider of claim 17 wherein the at least one of the first protrusion surface and the second protrusion surface is tilted towards a first side edge of the slider body.

19. The slider of claim 17 and further comprising a rail on the bearing surface.

20. A slider, comprising:

a slider body having a bearing surface having a bearing plane; and means for diverting air flow from a first side edge of the slider body to pressurize a protrusion surface tilted with respect to a central axis of the slider body.

21. The slider of claim 20, wherein the means for diverting air flow include a trench floor parallel with the protrusion surface.

22. The slider of claim 21, wherein the means for diverting air flow include an inlet open to fluid flow from the first side edge of the slider body.

23. The slider of claim 22, wherein the means for diverting air flow include side wall and trailing wall means for pressurizing the slider with airflow from the inlet.

\* \* \* \* \*